US010025742B2

United States Patent
Su et al.

(10) Patent No.: US 10,025,742 B2
(45) Date of Patent: Jul. 17, 2018

(54) JBOD APPARATUS HAVING BMC MODULE AND CONTROLLING METHOD FOR THE SAME

(71) Applicant: AIC INC., Taoyuan Hsien (TW)

(72) Inventors: Yu-Heng Su, Taoyuan Hsien (TW); Shih-Chieh Hsu, Taoyuan Hsien (TW); Hsin-Hsi Chen, Taoyuan Hsien (TW); Cheng-Han Lin, Taoyuan Hsien (TW); Chia-Sheng Hung, Taoyuan Hsien (TW)

(73) Assignee: AIC INC., Taoyuan Hsien (TW)

( * ) Notice: Subject to any disclaimer, the term of this patent is extended or adjusted under 35 U.S.C. 154(b) by 380 days.

(21) Appl. No.: 14/862,091

(22) Filed: Sep. 22, 2015

(65) Prior Publication Data

US 2017/0083472 A1 Mar. 23, 2017

(51) Int. Cl.
*G06F 13/40* (2006.01)
*G06F 3/06* (2006.01)
(Continued)

(52) U.S. Cl.
CPC ........ *G06F 13/4045* (2013.01); *G06F 3/0605* (2013.01); *G06F 3/067* (2013.01);
(Continued)

(58) Field of Classification Search
CPC ............. G06F 13/4022; G06F 13/4045; G06F 13/4068; G06F 3/0689; G06F 3/0659; G06F 3/067
See application file for complete search history.

(56) References Cited

U.S. PATENT DOCUMENTS

| 7,757,033 | B1 * | 7/2010 | Mehrotra | H04L 49/357 |
| | | | | 709/238 |
| 2013/0117766 | A1 * | 5/2013 | Bax | G06F 9/4405 |
| | | | | 719/323 |
| 2014/0277807 | A1 | 9/2014 | Mick et al. | |

FOREIGN PATENT DOCUMENTS

| CN | 102223499 B | 11/2014 |
| TW | 200715134 A | 4/2007 |
| TW | 201419003 A | 5/2014 |

OTHER PUBLICATIONS

Office Action dated Aug. 24, 2016 of the corresponding Taiwan patent application.

\* cited by examiner

*Primary Examiner* — Ernest Unelus
(74) *Attorney, Agent, or Firm* — Chun-Ming Shih; HDLS IPR Services

(57) ABSTRACT

A JBOD apparatus (1) having a hard disk drive (HDD) expander (11), a switch (13) and a BMC module (12) is disclosed. The HDD expander (11) is connected to a plurality of hard drives (5) respectively. The switch (13) connects the HDD expander (11) with a connecting port (14) for enabling a first transmission channel, or connects the HDD expander (11) with the BMC module (12) for enabling a second transmission channel. The BMC module (12) is connected to an Ethernet through a network port (17). The HDD expander (11) initially receives a wired transmitted command through the first transmission channel. When the BMC module (12) receives an Ethernet transmitted command through the Ethernet, it controls the switch (13) to change for enabling the second transmission channel, therefore, the BMC module (12) executes an interactive operation with the HDD expander (11) in accordance with the Ethernet transmitted command.

18 Claims, 7 Drawing Sheets

(51) Int. Cl.
*G06F 13/16* (2006.01)
*G06F 13/42* (2006.01)
(52) U.S. Cl.
CPC .......... *G06F 3/0659* (2013.01); *G06F 3/0689* (2013.01); *G06F 13/16* (2013.01); *G06F 13/4022* (2013.01); *G06F 13/4068* (2013.01); *G06F 13/42* (2013.01)

JBOD APPARATUS HAVING BMC MODULE AND CONTROLLING METHOD FOR THE SAME

BACKGROUND OF THE INVENTION

1. Field of the Invention

The invention relates to a JBOD apparatus, and in particularly to a JBOD apparatus having a BMC module.

2. Description of Prior Art

A mainboard of a host (such as a personal computer or a server) is usually arranged with limited amount of connecting ports for connecting hard drives. In some cases, the mainboard only has about 10 connecting ports, so the host can only connect about 10 hard drives. Therefore, the amount of hard drives of the host may not satisfy user's demand.

Just a Bunch Of Disks (JBOD) apparatus is usually arranged with more hard drive connecting ports (about 24 ports in general), so it can connect more hard drives than a traditional host does. As a result, if needing to use a large amount of hard drives, a user usually connects the host with the JBOD apparatus through a cable, and the amount of the connected hard drives of the host can be expanded through the JBOD apparatus.

It should be noted that the JBOD apparatus can serial connect with other JBOD apparatuses, so as to increase the total amount of connectable hard drives. For an instance, if one JBOD apparatus has 24 hard drive connecting ports, then it enables 120 hard drives to be connected therewith simultaneously if five JBOD apparatuses are serial connected together.

Generally, the JBOD apparatus connects a plurality of hard drives through an internal hard disk drive (HDD) expander, and uses the HDD expander to detect information of the JBOD apparatus and the plurality of hard drives. Also, the HDD expander generates corresponding detection information (such as temperature, power status, etc.). If connecting with the host, the JBOD apparatus can operate according to commands sent by the host, for example, transmits the detection information to the host, or accesses data inside the plurality of hard drives, etc.

Besides, the JBOD apparatus usually has at least one RS-232 connecting port for connecting an outer terminal. The terminal is operated by a manager, and the manager can execute technical-aspect managements to the JBOD apparatus, such as debug, or shut the hard drives down or reboot the hard drives through commands when one of the plurality of hard drives fails.

In particularly, the HDD expander connects with the RS-232 connecting port through a universal asynchronous receiver/transmitter (UART) interface, and receives control commands transmitted from the terminal through the RS-232 connecting port. Therefore, the manager can operate the terminal to execute the above mentioned managements for the JBOD apparatus.

Also, the user can transmit firmware updating files to the HDD expander through the terminal, so as to update firmware of the HDD expander.

However, no matter the JBOD apparatus is connected to the host or the terminal, the user needs to arrange at least one cable for the connection, and the connected host or terminal needs to be arranged around the JBOD apparatus. In other words, the current JBOD apparatus is unable to provide remote connection and management function, which is inconvenient. As a result, the manager cannot operate the JBOD apparatus at a remote place. If the JBOD apparatus fails, the user needs to request the manager to come to a local place where the JBOD apparatus is arranged, then the manager can operate the terminal to solve the failure of the JBOD apparatus.

On the other hand, the current terminal usually uses text-command based interface to communicate with the HDD expander. As a result, if the user wants to manage the JBOD apparatus through operating the terminal by himself/herself, he or she needs to overcome a very high technical barrier.

Besides, if the user wants to access data of the JBOD apparatus through the host, and also wants to manage the JBOD apparatus through the terminal, then a plurality of cables is needed, and it will cause a huge inconvenience for the user.

SUMMARY OF THE INVENTION

The object of the present invention is to provide a JBOD apparatus having BMC module, which can connect to Ethernet for receiving control commands remotely sent from a client-end computer, so as to support a user to inquiry or control the JBOD apparatus or to update firmware of the JBOD apparatus remotely through the Ethernet.

According to the above object, the present invention discloses a JBOD apparatus having a hard disk drive (HDD) expander, a switch and a BMC module. The HDD expander is connected to a plurality of disks respectively. The switch connects the HDD expander with a connecting port for enabling a first transmission channel, or connects the HDD expander with the BMC module for enabling a second transmission channel. The BMC module is connected to an Ethernet through a network port. The HDD expander initially receives a wired transmitted command through the first transmission channel. When the BMC module receives an Ethernet transmitted command through the Ethernet, it controls the switch to change for enabling the second transmission channel, therefore, the BMC module executes an interactive operation with the HDD expander in accordance with the Ethernet transmitted command.

In comparison with related art, the present invention uses the BMC module to connect with the Ethernet, and receives control commands remotely sent from the client-end computer through the Ethernet. Therefore, a user can operate the client-end computer for remotely inquiring status of the plurality of hard drives respectively connected to the JBOD apparatus, and respectively controlling the plurality of hard drives to turn on or turn off.

Also, the JBOD apparatus of the present invention receives a firmware updating file remotely sent from the client-end computer through the Ethernet, and updates firmware used by the HDD expander in accordance with the received firmware updating file. Therefore, the user can update the firmware of the HDD expander in a remote place, which is very convenient.

Besides, the BMC module of the JBOD apparatus of the present invention has a stand-by power, so the BMC module will not shut down after the JBOD apparatus is powered off. Therefore, the user can still transmit control commands to the BMC module through the Ethernet after the JBOD apparatus is powered off by the remote client-end computer operated by the user. Therefore, the user can boot the JBOD apparatus directly in the remote place through the BMC module.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
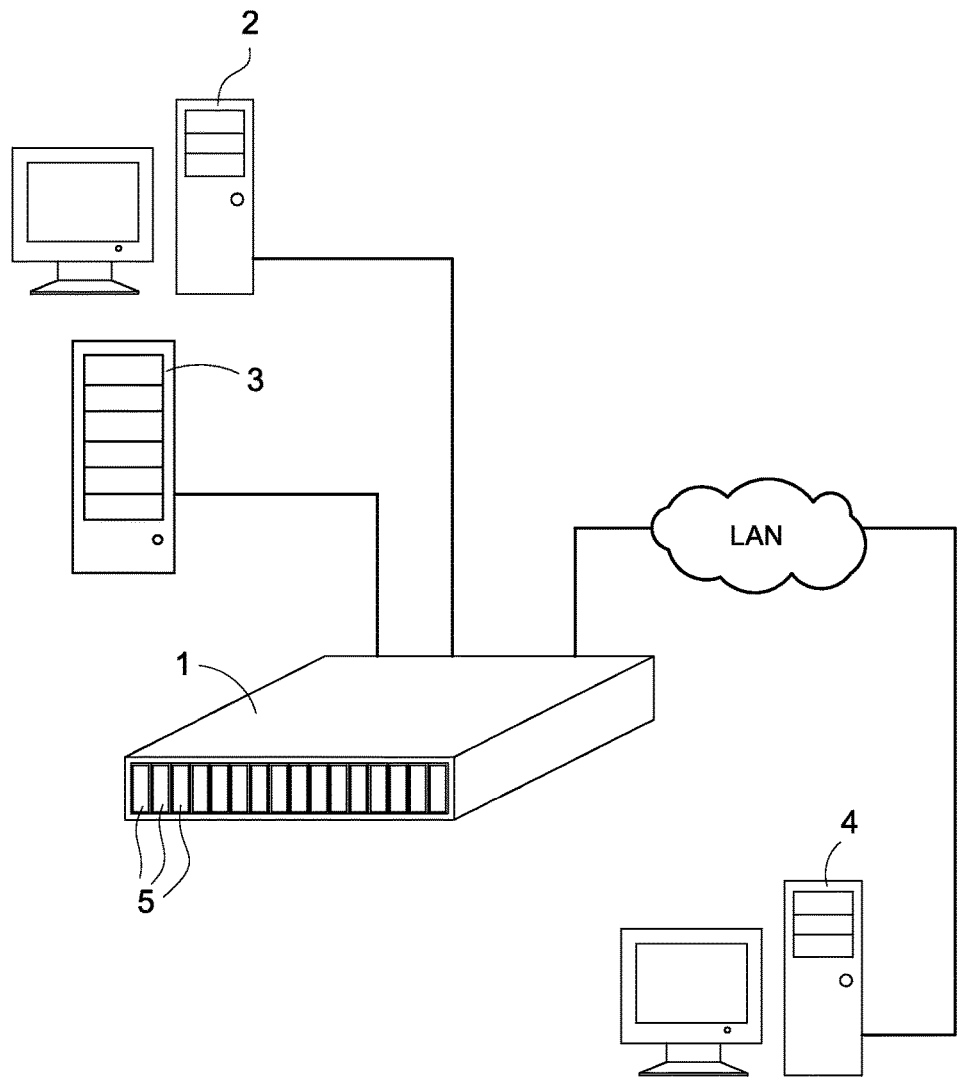
FIG. 1 is a connection diagram of a first embodiment according to the present invention.

Refer to FIG. 1, which is a connection diagram of a first embodiment according to the present invention. The present invention discloses a just a bunch of disks (JBOD) apparatus 1 having a baseboard management controller (BMC) module. The JBOD apparatus 1 connects a plurality of hard drives 5 respectively and independently, and in this embodiment, the JBOD apparatus 1 adopts serial attached SCSI (SAS), but not limited thereto.

In this embodiment, the JBOD apparatus connects to a host 2 through a cable which is able to support the SAS format. When operating the host 2, a user can access the plurality of hard drives 5 respectively connected to the JBOD apparatus 1 upon the host 2. Therefore, the amount of accessible hard drive of the host will be greatly increased.

The JBOD apparatus 1 also connects to a terminal 3 through other cable. The terminal 3 is operated by a manager (not shown), and the manager can operate the terminal 3 to send commands to the JBOD apparatus 1 to inquiry information of the JBOD apparatus 1, for example, environment temperature inside a case of the JBOD apparatus 1, status of fans, status of power, or status of the plurality of hard drives 5 (for example, inserted, removed, turned on, turned off, failure, etc.).

Figure 2:
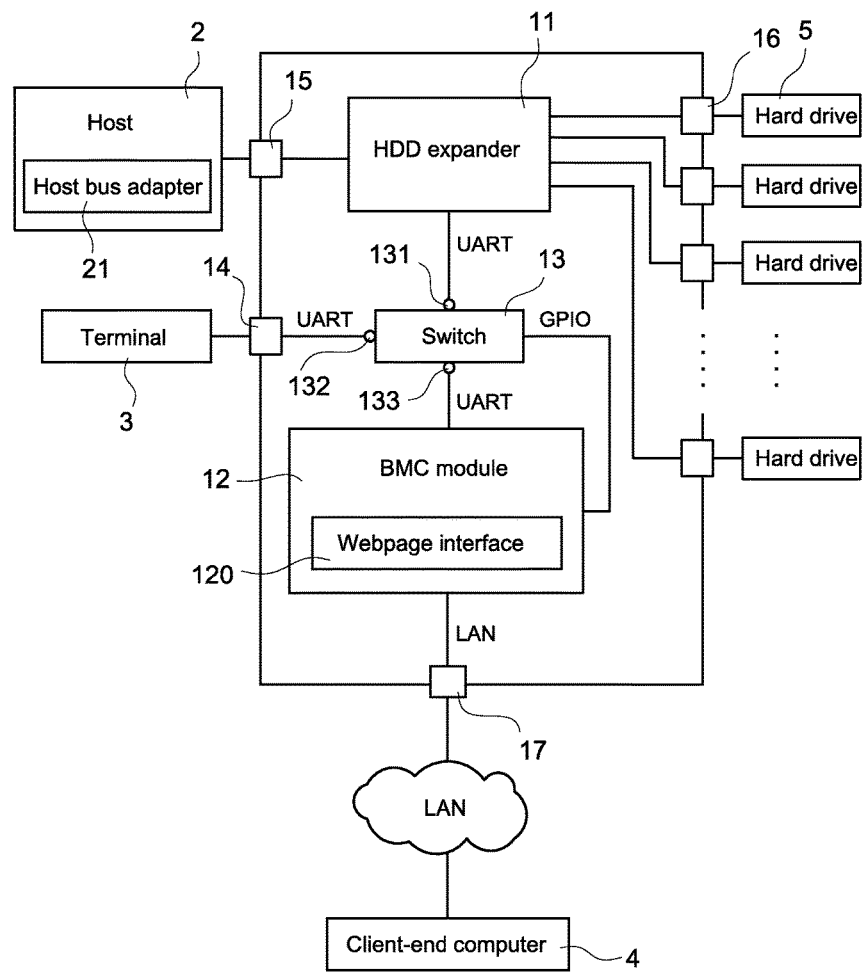
FIG. 2 is a block diagram of JBOD apparatus of a first embodiment according to the present invention.

Also, if the terminal 3 is able to support a x-modem communication protocol, the manager can transmit a firmware updating file to the JBOD apparatus 1 through the terminal 3, so as to update a firmware used by a hard disk drive (HDD) expander 11 (as shown in FIG. 2) of the JBOD apparatus 1.

It should be mentioned that the JBOD apparatus 1 in this embodiment has a BMC module 12 (as shown in FIG. 2). The JBOD apparatus 1 can connect to a network through the BMC module 12, and in particularly, the JBOD apparatus 1 can connect to an Ethernet through the BMC module 12. In this embodiment, the JBOD apparatus 1 can connect to a remote client-end computer 4 through the Ethernet. Therefore, the JBOD apparatus 1 can receive operations from a local user through the host 2 or from a local manager through the terminal 3, and can also connect with the remote client-end computer 4 through the Ethernet and execute operations according to the Ethernet transmitted commands from other user, which is very convenient.

Besides, if the host 2 is powered on, the user can connect to the host 2 through the network, and controls the JBOD apparatus 1 remotely through the host 2. However, if the host 2 hibernates, is powered off or fails, the user cannot connect thereto for controlling the JBOD apparatus 1 remotely. As such, the current remote controlling method is not comprehensive.

Refer to FIG. 2, which is a block diagram of JBOD apparatus of a first embodiment according to the present invention. As shown in FIG. 2, the JBOD apparatus 1 in the present invention comprises the HDD expander 11, the BMC module 12 and a switch 13. In particularly, the JBOD apparatus 1 further comprises a first connecting port 14, a second connecting port 15, a plurality of third connecting ports 16 and a network port 17.

The HDD expander 11 is respectively connected to the plurality of third connecting ports 16 through several cables, so as to connect to the plurality of hard drives 5 through the plurality of third connecting ports 16 respectively, or to serial connect to other JBOD apparatuses 1 through the plurality of third connecting ports 16. In this embodiment, the HDD expander 11 is used to detect and gather information of the JBOD apparatus 1, for example, environment temperature inside the case of the JBOD apparatus 1, status of the fans, status of power, insertion status or power status of the plurality of hard drives 5, etc., and the HDD expander 11 generates corresponding apparatus data then. In this embodiment, the plurality of third connecting ports 16 comprises serial advanced technology attachment (SATA) connecting ports or SAS connecting ports, and the plurality of hard drives 5 comprises hard drives which are able to support the SATA interface or the SAS interface, but not limited thereto.

The HDD expander 11 is also connected to the second connecting port 15, and connected to the host 2 externally through the second connecting port 15. In particularly, the host 2 has a host bus adapter (HBA) 21 arranged thereon, and the second connecting port 15 is a SAS connecting port, and the manager connects the HBA 21 to the second connecting port 15 through a cable which is able to support the SAS format, so as to connects the host 2 to the JBOD apparatus 1 (i.e., connects the host 2 to the HDD expander 11).

The host 2 in this embodiment can transmit commands to the JBOD apparatus 1 through the HBA 21, so as to request necessary information from the JBOD apparatus 1 (such as the apparatus data mentioned above). Moreover, the host 2 can access data stored in the plurality of hard drives 5 respectively through programs installed in the HBA 21. Furthermore, if the host 2 is connected to the network (LAN for example), then the host 2 can receive a remote command through the network, and execute corresponding operations to the JBOD apparatus 1 according to the remote command, for example, requesting the apparatus data from the JBOD apparatus, controlling the JBOD apparatus 1 or each of the plurality of hard drives 5 to turn on or to turn off, etc.

The switch 13 is connected to the HDD expander 11, the BMC module 12 and the first connecting port 14. In particularly, the switch 13 can connect the HDD expander 11 with the first connecting port 14 to enable a first transmission channel, and can connect the HDD expander 11 with the BMC module 12 to enable a second transmission channel. In this embodiment, the switch 13 is to receive a switching signal, and decides to enable the first transmission channel or the second transmission channel in accordance with the received switching signal. In other words, the first transmission channel and the second transmission channel are not enabled at the same time, i.e., the HDD expander 11 is alternatively connected with the first connecting port 14 or the BMC module 12 at a time.

In particularly, the switch 13 in this embodiment comprises a first contact 131, a second contact 132 and a third contact 133, wherein the switch 13 is connected to the HDD expander 11 through the first contact 131, connected to the first connecting port 14 through the second contact 132, and connected to the BMC module 12 through the third contact 133. When choosing to enable the first transmission channel, the switch 13 connects the first contact 131 to the second contact 132. When choosing to enable the second transmission channel, the switch 13 cuts off the connection between the first contact 131 and the second contact 132, and changes to connect the first contact 131 to the third contact 133. However, the above description is just a specific embodiment, not intended to limit the scope of the present invention.

The first connecting port 14 is used to connect with the terminal 3 externally, so as to receive the commands sent from the terminal 3. If the first transmission channel is enabled, the HDD expander 11 can receive the command sent from the terminal 3 through the first connecting port 14, and executes corresponding actions based on the received command, and replies to the terminal 3 with related information.

In this embodiment, the first connecting port 14 comprises a phone jack connector or a DB9 connector, but not limited thereto. The manager connects the first connecting port 14 with a corresponding connector arranged on the terminal 3 (not shown) through a cable, so as to connect the terminal 3 to the JBOD apparatus 1 (i.e., connects the terminal 3 to the HDD expander 11).

The BMC module 12 is connected to the network port 17, and connected to the Ethernet through the network port 17. In this embodiment, the default setting of the switch 13 is to enable the first transmission channel. When the BMC module 12 receives a control command sent from a remote place through the Ethernet, it generates and sends the switching signal to the switch 13, and controls the switch 13 to change to enable the second transmission channel. Therefore, the BMC module 12 can connect with the HDD expander 11 through the enabled second transmission channel, and executes an interactive operation with the HDD expander 11 in accordance with the control command transmitted through the Ethernet (which is an Ethernet transmitted command).

In this embodiment, the network port 17 comprises a local area network (LAN) port, but not limited thereto.

In should be noted that in one of a plurality of exemplary embodiments, the BMC module 12 and the network port 17 are respectively arranged on a mainboard (not shown) of the JBOD apparatus 1, and are electrically connected with each other through circuits upon the mainboard. In other exemplary embodiment, the BMC module 12 is a BMC interface card, which is inserted in an interface card slot of the mainboard for completing an electrical connection therewith. In this embodiment, the network port 17 is arranged on the BMC module 12 directly, but not limited thereto.

As shown in FIG. 2, the BMC module 12 in this embodiment is further connected to the switch 13 through a general purpose I/O (GPIO) interface, and transmits the switching signal to the switch 13 through the GPIO interface, so as to control the switch 13 to enable the first transmission channel or the second transmission channel.

In particularly, the BMC module 12 generates and transmits the switching signal to the switch 13 for enabling the second transmission channel when receiving the control command sent from the client-end computer 4 through the Ethernet. Further, the BMC module 12 generates and transmits other switching signal to the switch 13 for enabling the first transmission channel after the interactive operation is executed completely.

In this embodiment, the default setting of the switch 13 is to enable the first transmission channel, it is to say, the HDD expander 11 is initially connected to the first connecting port 14, and further connected to the terminal 3 which is connected to the first connecting port 14. Furthermore, the switch 13 changes to enable the second transmission channel only if the user operates the client-end computer 4 and the client-end computer 4 transmits the control command to the BMC module 12 through the Ethernet. In other words, the HDD expander 11 will be connected to the BMC module 12 only when the BMC module 12 receives the control command through the Ethernet.

In this embodiment, the HDD expander 11 is able to support signal in a universal asynchronous receiver/transmitter (UART) format, and the HDD expander 11 communicates with the BMC module 12 and the first connecting port 14 (i.e., the terminal 3 connected to the first connecting port 14) through transmitting the UART format signal. Moreover, the BMC module 12 in this embodiment receives the control command in a LAN format through the Ethernet, and transmits the control command to the HDD expander 11 after transforming the control command into the UART format.

As shown in FIG. 2, the BMC module 12 comprises a webpage interface 120. In this embodiment, the BMC module 12 receives a remote connection from the client-end computer 4 through the webpage interface 120. Therefore, the BMC module 12 can receive the control command remotely sent from the client-end computer 4 through the webpage interface 120.

More specifically, after the BMC module 12 boots, it runs the webpage interface 120 automatically, wherein the webpage interface 120 uses an IP address assigned to the BMC module 12.

If the user wants to connect to the JBOD apparatus 1 at the remote place, he or she can open a browser of the client-end computer 4 and input the IP address used by the BMC module 12 (which is used by the webpage interface 120), so as to login to the webpage interface 120. In this embodiment, the webpage interface 120 provides multiple options by way of graphics, wherein each of the multiple options is respectively corresponding to an executable action, for example, inquiring the status of the JBOD apparatus 1 or the plurality of hard drives 5, controlling the JBOD apparatus 1 or each of the plurality of hard drives 5 to turn on or to turn off, updating the firmware of the HDD expander 11, logging to the HDD expander 11 remotely, setting a power schedule of the JBOD apparatus 1, etc. If the user chooses one of the multiple options upon the webpage interface 120, a corresponding control command is generated and transmitted to the BMC module 12 through the Ethernet.

For an instance, if the user chooses, upon the webpage interface 120, an option corresponding to an action for inquiring the status of the plurality of hard drives 5, a corresponding control command is generated and transmitted to the BMC module 12 through the Ethernet. After receiving the control command transmitted through the Ethernet, the BMC module 12 controls the switch 13 to enable the second transmission channel, and connects to the HDD expander 11 through the enabled second transmission channel, so as to request the HDD expander 11 to inquire the status of the plurality of hard drives 5 respectively in accordance with the control command.

After receiving the above mentioned request, the HDD expander 11 inquires the status of the plurality of hard drives 5 respectively in accordance with the content of the control command, and replies to the BMC module 12 with corresponding apparatus data. Finally, the BMC module 12 can update the information displayed on the webpage interface 120 based on the apparatus data. Therefore, the user can directly obtain the current status of the plurality of hard drives 5 upon the updated webpage interface 120, for example, how many hard drives have been inserted, how many hard drives have been inserted but not turned on, how many hard drives have been turned on, how many hard drives have failed, etc.

It should be mentioned that the webpage interface 120 in this embodiment displays the status of the plurality of hard drives 5 and the JBOD apparatus 1 through a graphical user interface (GUI), and the remote user can easily understand the information displayed by the webpage interface 120.

Figure 3:
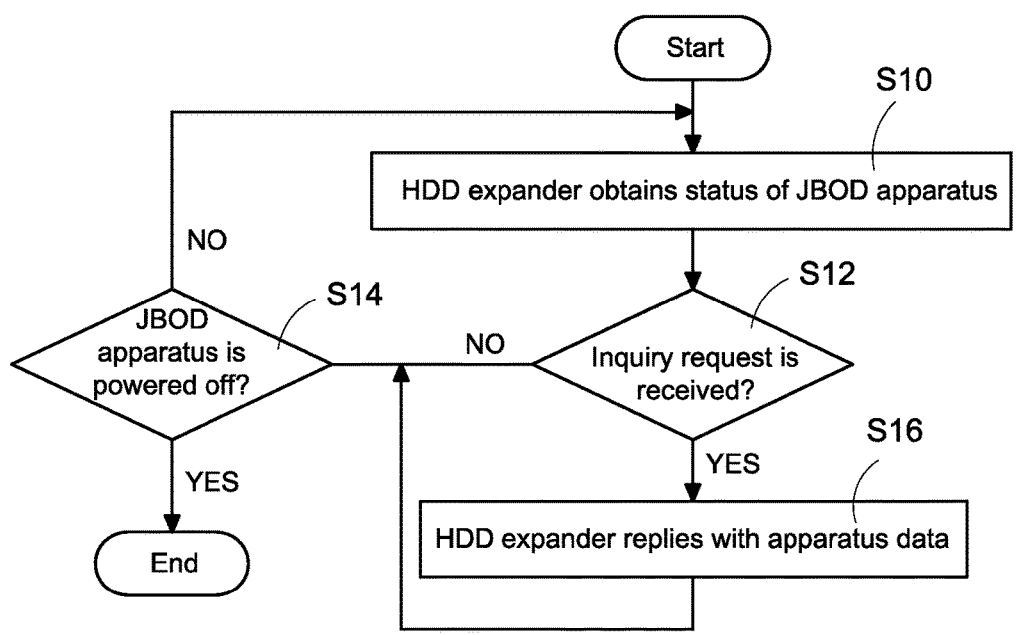
FIG. 3 is an apparatus data inquiring flowchart of a first embodiment according to the present invention.

FIG. 3 is an apparatus data inquiring flowchart of a first embodiment according to the present invention. In this embodiment, the mainboard of the JBOD apparatus 1 is provided with one or more sensors (not shown), and the HDD expander 11 can obtain the status of the JBOD apparatus 1 through detecting actions executed by the sensors (step S10). The HDD expander 11 determines whether it receives an inquiry request for inquiring the status of the JBOD apparatus 1 or not (step S12), and decides whether to reply with corresponding apparatus data according to the inquiry request or not.

In this embodiment, the content of the apparatus data depends on the content of the inquiry request, and basically comprises the environment temperature inside the case of the JBOD apparatus 1, the status of the fans, the status of power, or the power status of the plurality of hard drives 5, but not limited thereto.

If not receiving the inquiry request yet, the HDD expander 11 determines whether the JBOD apparatus 1 is powered off (step S14), and keeps obtaining the status of the JBOD apparatus (such as the environment temperature inside the case, the status of the fans, the status of power, the status of the plurality of hard drives, etc.), through the plurality of sensors, before the JBOD apparatus 1 is powered off. If receiving the inquiry request, the HDD expander 11 replies with corresponding apparatus data according to the content of the received inquiry request (step S16).

It should be mentioned that if the second transmission channel is enabled, the inquiry request is sent by the BMC module 12, so the HDD expander 11 will reply to the BMC module 12 with the corresponding apparatus data through the second transmission channel. If the first transmission channel is enabled, the inquiry request is sent by the terminal 3, so the HDD expander 11 will reply to the terminal 3 with the corresponding apparatus data through the first transmission channel. Besides, the HDD expander 11 may also receive the inquiry request through the second connecting port 15, and in this case, the HDD expander 11 will reply to the host 2 with the corresponding apparatus data through the second connecting port 15.

Figure 4:
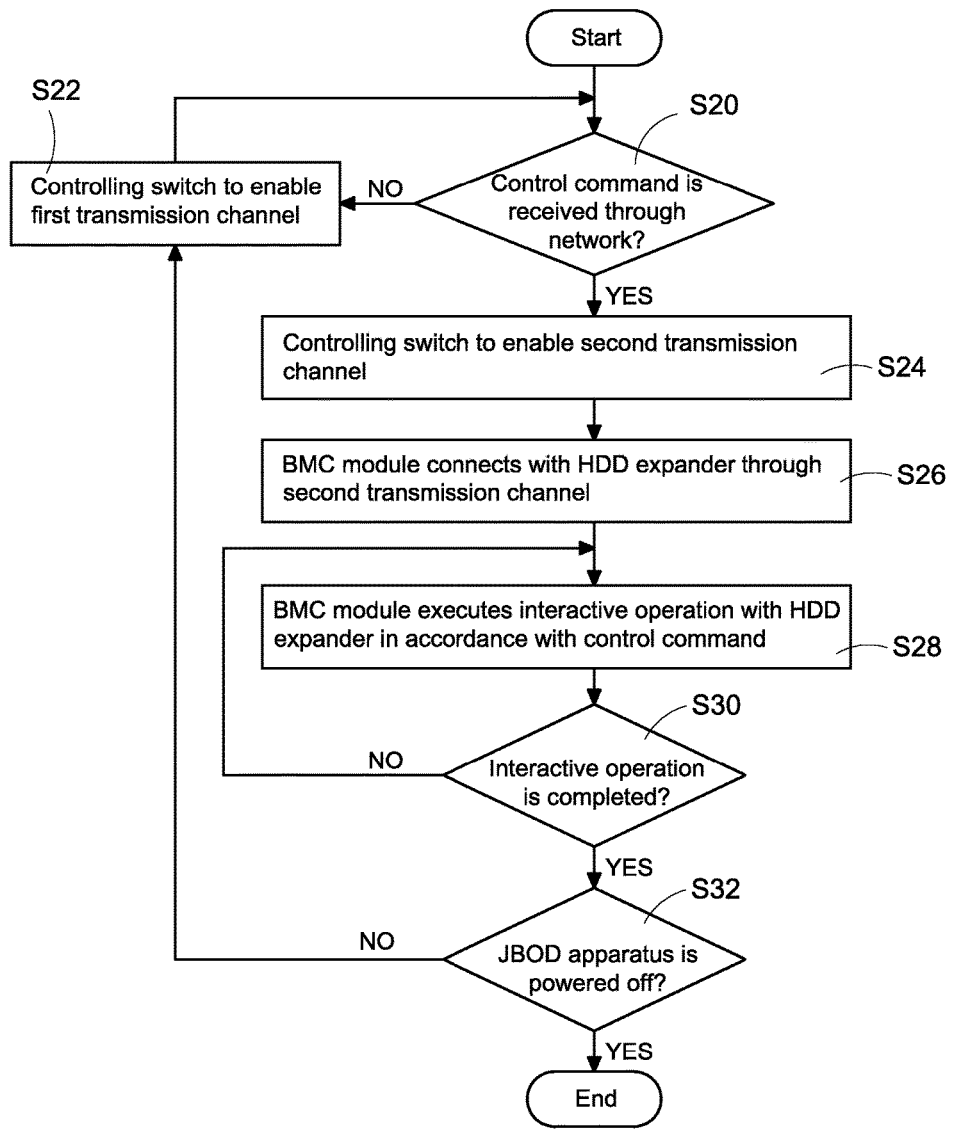
FIG. 4 is a controlling flowchart of a first embodiment according to the present invention.

FIG. 4 is a controlling flowchart of a first embodiment according to the present invention. The present invention also discloses a controlling method adopted by the JBOD apparatus 1 set forth above. The controlling method comprises following steps as described in FIG. 4.

As shown in FIG. 4, during an operating procedure of the JBOD apparatus 1, the BMC module 12 first determines whether it receives the control command through the network or not (step S20), and in particularly, the BMC module 12 determines whether the control command is received through the Ethernet, wherein the control command is sent from the client-end computer 4 through operating the webpage interface 120.

If not receiving the control command through the Ethernet, the BMC module 12 generates the switching signal to control the switch 13 to enable the first transmission channel (step S22). It should be noted that the BMC module 12 in this embodiment only controls the switch 13 to enable the second transmission channel when the control command is received through the Ethernet, in the rest of time, the first transmission channel is kept enabled. As such, if the first transmission channel is currently enabled, the step S22 is not necessary.

If receiving the control command through the Ethernet, the BMC module 12 generates the switching signal and transmits the switching signal to the switch 13 through the GPIO interface, so as to control the switch 13 to enable the second transmission channel (step S24). Therefore, the BMC module 12 can connect with the HDD expander 11 through the second transmission channel (step S26).

After the step S26, the BMC module 12 executes the above mentioned interactive operation with the HDD expander 11 in accordance with the control command transmitted through the Ethernet (step S28).

In one of the plurality of exemplary embodiments, the control command is an inquiring command, and the interactive operation comprises following actions: (1) the HDD expander 11 inquiries the status of the JBOD apparatus 1 in accordance with the inquiring command; (2) the HDD expander 11 replies to the BMC module 12 with the corresponding apparatus data; and (3) the BMC module 12 updates the webpage interface 120 according to the apparatus data.

In other one of the plurality of exemplary embodiments, the control command is a switching command, and the interactive operation comprises following actions: (1) the HDD expander 11 switches a power status of the JBOD apparatus 1 or the plurality of hard drives 5 respectively in accordance with the switching command; and (2) the BMC module 12 updates the webpage interface 120 according to the switched power status.

In another one of the plurality of exemplary embodiments, the control command is an updating command, and the interactive operation comprises following actions: (1) the BMC module 12 transmits the updating command and a firmware updating file transmitted from the client-end computer 4 to the HDD expander 11; and (2) the HDD expander 11 updates its firmware in accordance with the received updating command and the firmware updating file. It should be noted that the BMC module 12 in the present invention is able to support the x-modem protocol. In the above updating action, the BMC module 12 is to transmit the firmware updating file to the HDD expander 11 according to the x-modem protocol, and then the HDD expander 11 can execute the updating action for updating its own firmware.

After the step S28, the BMC module 12 determines whether the interactive operation is completed, i.e., whether the above inquiring action, switching action or updating action is executed completely or not (step S30). The step S28 is continually executed if the interactive operation is not completed. If the interactive operation is completed, the BMC module 12 further determines whether the JBOD apparatus 1 is powered off or not (step S32). In this embodiment, the BMC module 12 goes back to execute the step S22 if the JBOD apparatus 1 is not powered off, so as to generate the switching signal and controls the switch 13 to enable the first transmission channel.

It should be mentioned that in addition to the inquiring action, the switching action and the updating action, the user can also set a power schedule for the JBOD apparatus 1 through the webpage interface 120, and the webpage interface 120 will generate corresponding control command according to the power schedule. Therefore, the HDD expander 11 can follow the power schedule based on the control command generated by the webpage interface 120, and turns on/turns off or reset the plurality of hard drives 5 or the JBOD apparatus 1 on each scheduled time.

Figure 5:
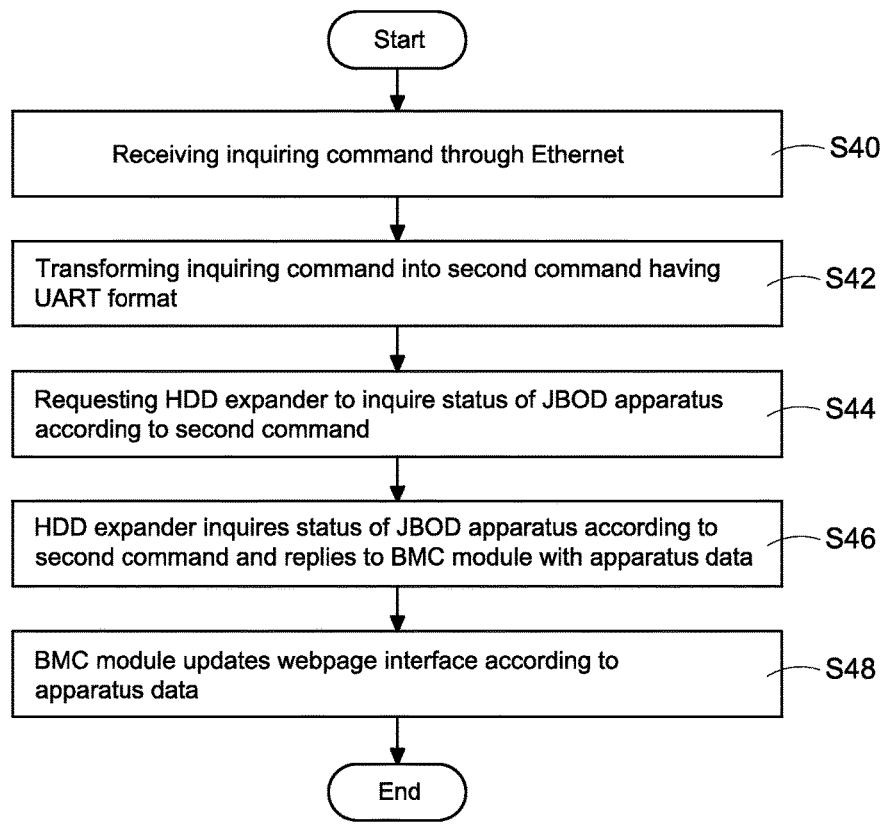
FIG. 5 is a controlling flowchart of a second embodiment according to the present invention.

FIG. 5 is a controlling flowchart of a second embodiment according to the present invention. In the embodiment disclosed in FIG. 5, the control command is the inquiring command. The BMC module 12 in this embodiment receives the inquiring command through the Ethernet (step S40), and transforms the inquiring command into a second command which has the UART format (step S42). Further, the BMC module 12 requests the HDD expander 11 to inquire the status of the JBOD apparatus 1 according to the second command (step S44).

The HDD expander 11 inquires the status of the JBOD apparatus 1 according to the second command after receiving the request, and replies to the BMC module 12 with the inquired apparatus data (step S46). Finally, the BMC module 12 updates the webpage interface 120 according to the received apparatus data (step S48). Therefore, the user can obtain the apparatus data in a graphical form upon the webpage interface 120, and realizes the environment temperature inside the case of the JBOD apparatus 1, the status of the fans, the status of power, or the status of the plurality of hard drives 5 (for example, which hard drive 5 is inserted, which hard drive 5 is removed, which hard drive 5 fails, which of the plurality of inserted hard drive 5 is turned on, which of the plurality of inserted hard drive 5 is turned off, etc.).

Figure 6:
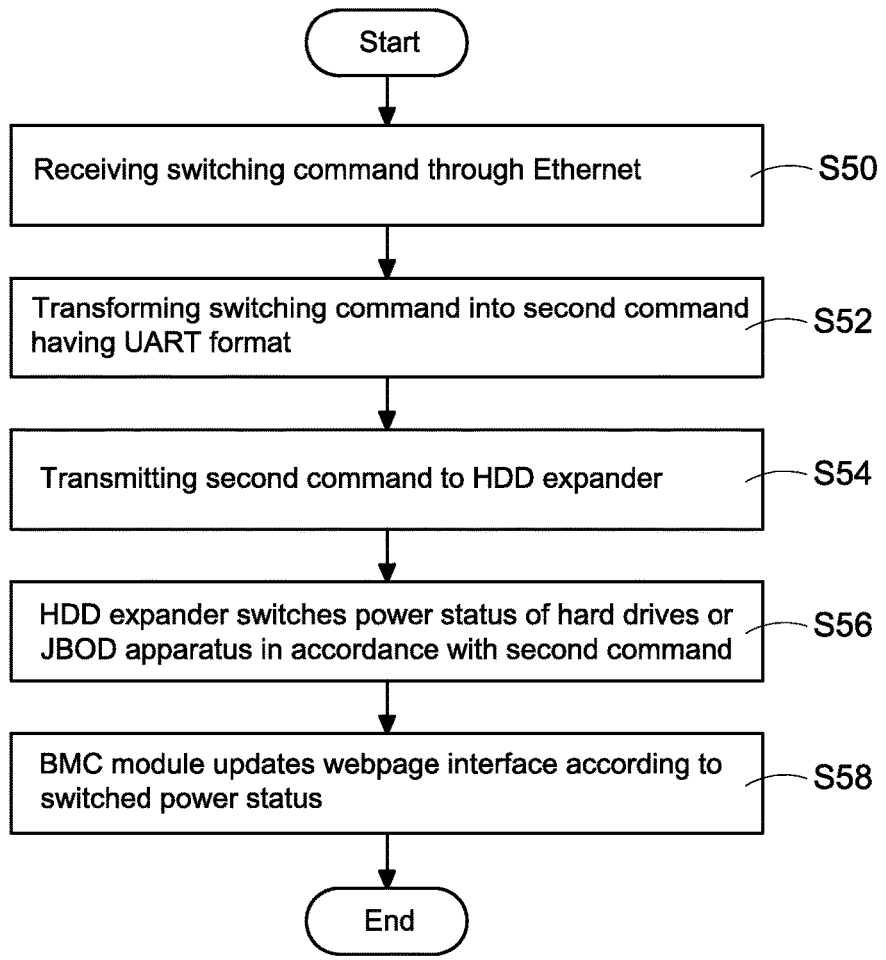
FIG. 6 is a controlling flowchart of a third embodiment according to the present invention.

FIG. 6 is a controlling flowchart of a third embodiment according to the present invention. In the embodiment disclosed in FIG. 6, the control command is the switching command. The BMC module 12 in this embodiment receives the switching command through the Ethernet (step S50), and transforms the switching command into the second command which has the UART format (step S52). Further, the BMC module 12 transmits the second command to the HDD expander 11 (step S54).

After the step S54, the HDD expander 11 switches the power status of the plurality of hard drives 5 respectively, or switches the power status of the JBOD apparatus 1, in accordance with the second command (step S56). Finally, the BMC module 12 updates the webpage interface 120 according to the switched power status. Therefore, the user can obtain the current status of the plurality of hard drives 5 or the JBOD apparatus 1 after being switched upon the webpage interface 120 at the remote place.

In should be mentioned that the BMC module 12 in the present invention has a stand-by power. As such, all or part of components of the BMC module 12 can keep operating even the JBOD apparatus 1 is powered off. In other words, the BMC module 12 can still receive the control command successfully when the JBOD apparatus 1 is powered off. Therefore, the present invention can implement a remote booting function of the JBOD apparatus 1.

Figure 7:
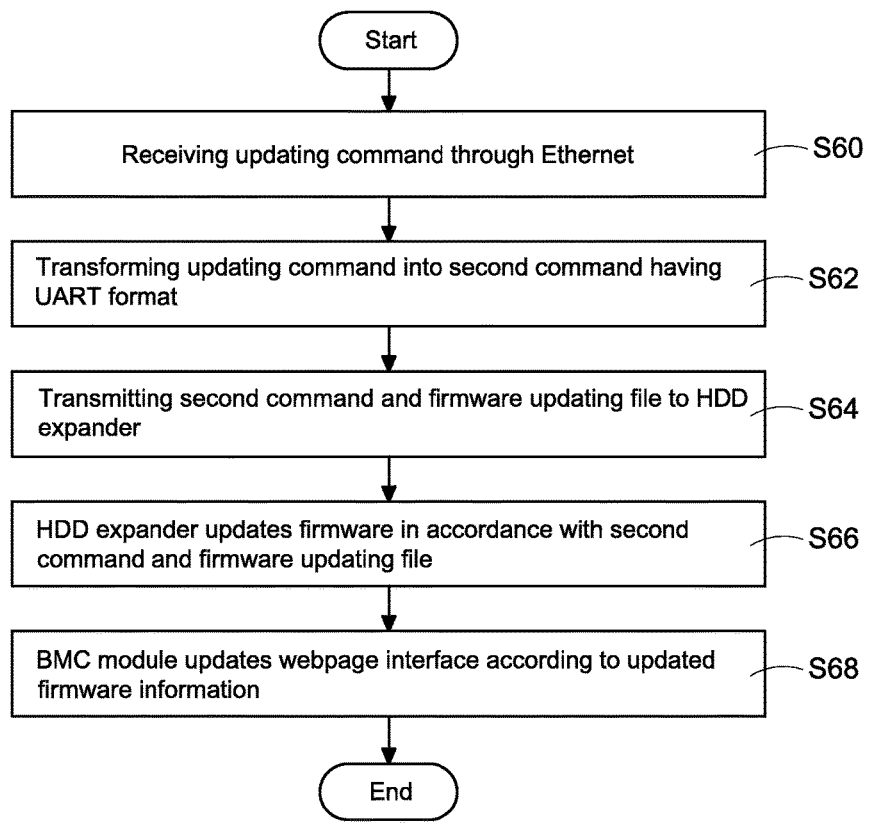
FIG. 7 is a controlling flowchart of a fourth embodiment according to the present invention.

FIG. 7 is a controlling flowchart of a fourth embodiment according to the present invention. In the embodiment disclosed in FIG. 7, the control command is the updating command. The BMC module 12 in this embodiment receives the updating command through the Ethernet, and it also receives the firmware updating file simultaneously (step S60). The BMC module 12 then transforms the updating command into the second command which has the UART format (step S62). In this embodiment, the BMC module 12 can receive the updating command and the firmware updating file at the same time. In other embodiment, the BMC module 12 can receive the updating command first, and receive the firmware updating file after confirming the user intends to update the firmware of the HDD expander 11.

Further, the BMC module 12 transmits the second command and the firmware updating file to the HDD expander 11 (step S64), therefore, the HDD expander 11 can update its firmware in accordance with the second command and the firmware updating file (step S66). After the step S66, the BMC module 12 updates the webpage interface 120 in according to the updated firmware information (such as version, updated function, etc.). Therefore, the user can obtain the current information of the HDD expander 11 upon the webpage interface 120 at the remote place.

It should be mentioned that the BMC module 12 in this embodiment is able to support the x-modem protocol. As such, in the step S64 set forth above, the BMC module 12 transmits the firmware updating file to the HDD expander 11 through the x-modem protocol, but not limited thereto. Therefore, the manager can update the firmware of the HDD expander 11 through the terminal 3 at the local place, and the user can operate the client-end computer 4 for updating the firmware of the HDD expander 11 through the Ethernet at the remote place, which is very convenient.

As the skilled person will appreciate, various changes and modifications can be made to the described embodiment. It is intended to include all such variations, modifications and equivalents which fall within the scope of the present invention, as defined in the accompanying claims.

What is claimed is:

1. A JBOD apparatus for connecting with a plurality of hard drives, comprising:
    a HDD expander for connecting with the plurality of hard drives;
    a connecting port for connecting with an external terminal;
    a network port;
    a baseboard management controller (BMC) module connected to the network port, and connected to an Ethernet through the network port; and
    a switch, connecting the HDD expander 11 with the connecting port for enabling a first transmission channel, or connecting the HDD expander with the BMC module for enabling a second transmission channel, wherein the switch comprises a first contact connected with the HDD expander, a second contact connected with the connecting port, and a third contact connected with the BMC module, the switch connects the first contact to the second contact to enable the first transmission channel or connects the first contact to the third contact to enable the second transmission channel in accordance with a switching signal;
    wherein, the switch is default enabling the first transmission channel and is controlled by the BMC module through sending the switching signal to switch and enable the second transmission channel when the BMC module receives a control command through the Ethernet, and the BMC module executes an interactive operation with the HDD expander through the enabled second transmission channel in accordance with the control command, and the switch is controlled by the BMC module through sending the switching signal to switch and enable the first transmission channel again after the interactive operation is completed.

2. The JBOD apparatus in claim 1, wherein the BMC module is a BMC interface card, and the network port is arranged on the BMC module.

3. The JBOD apparatus in claim 2, wherein the network port comprises a LAN port, and the JBOD apparatus is connected to the Ethernet through the LAN port.

4. The JBOD apparatus in claim 1, wherein the connecting port comprises a phone jack connector or a DB9 connector, and the HDD expander receives the control command transmitted from the terminal through the first transmission channel and the connecting port when the first transmission channel is enabled.

5. The JBOD apparatus in claim 1, wherein the BMC module is connected with the switch through a GPIO interface, and the BMC module transmits the switching signal to the switch through the GPIO interface to control the switch to enable the second transmission channel when receiving the control command through the Ethernet.

6. The JBOD apparatus in claim 5, wherein the BMC module comprises a webpage interface, and the BMC module accepts a connection from a remote client-end computer through the webpage interface, and receives the control command transmitted by the client-end computer through the webpage interface.

7. The JBOD apparatus in claim 6, wherein the control command is an inquiring command, the interactive operation is to inquiry status of the JBOD apparatus in accordance with the inquiring command by the HDD expander, to reply to the BMC module with a corresponding apparatus data by the HDD expander, and to update the webpage interface according to the apparatus data by the BMC module, wherein the apparatus data comprises environment temperature inside a case of the JBOD apparatus, status of fans of the JBOD apparatus, status of a power of the JBOD apparatus or power status of the plurality of hard drives.

8. The JBOD apparatus in claim 6, wherein the control command is a switching command, the interactive operation is to switch a power status of the JBOD apparatus or the plurality of hard drives respectively in accordance with the switching command by the HDD expander, and to update the webpage interface according to the switched power status by the BMC module.

9. The JBOD apparatus in claim 6, wherein the control command is an updating command, the interactive operation is to transmit the updating command and a firmware updating file sent from the client-end computer through the Ethernet to the HDD expander by the BMC module, and to update a firmware used by the HDD expander in accordance with the updating command and the firmware updating file by the HDD expander.

10. The JBOD apparatus in claim 9, wherein the BMC module transmits the control command to the HDD expander through the second transmission channel after transforming the control command into a UART format, wherein the BMC module is able to support an x-modem protocol, and transmits the firmware updating file to the HDD expander through the x-modem protocol.

11. A controlling method of a JBOD apparatus, the JBOD apparatus comprising a HDD expander for connecting a plurality of hard drives, a connecting port, a network port for connecting to an Ethernet, a baseboard management controller (BMC) module connected with the network port, and a switch, wherein the switch connecting the HDD expander with the connecting port for enabling a first transmission channel or connecting the HDD expander with the BMC module for enabling a second transmission channel, wherein the switch is default enabling the first transmission channel, and the controlling method comprising:

a) determining whether a control command is received through the Ethernet by the BMC module;

b) controlling the switch to switch and enable the second transmission channel by the BMC module when receiving the control command through the Ethernet, wherein the switch comprises a first contact connected to the HDD expander, a second contact connected to the controlling port, and a third contact connected to the BMC module, and the switch is controlled by the BMC module through sending a switching signal to connect the first contact to the third contact for enabling the second transmission channel;

c) connecting to the HDD expander through the enabled second transmission channel by the BMC module;

d) executing an interactive operation with the HDD expander in accordance with the received control command by the BMC module after the step c; and e) controlling the switch to switch and enable the first transmission channel again after the interactive operation is completed by the BMC module, wherein the switch is controlled by the BMC module through sending the switching signal to connect the first contact to the second contact for enabling the first transmission channel.

12. The controlling method in claim 11, wherein the connecting port comprises a phone jack connector or a DB9 connector, the JBOD apparatus is connected to an external terminal through the connecting port, and the HDD expander receives the control command transmitted from the terminal through the first transmission channel and the connecting port when the first transmission channel is enabled.

13. The controlling method in claim 11, wherein the BMC module is connected with the switch through a GPIO interface, and the BMC module transmits the switching signal to the switch through the GPIO interface to control the switch for enabling the second transmission channel in the step b, and the BMC module transmits the switching signal to the switch through the GPIO interface to control the switch for enabling the first transmission channel in the step e.

14. The controlling method in claim 13, wherein the BMC module comprises a webpage interface and the BMC module accepts a connection from a remote client-end computer through the webpage interface, and the BMC module is to determine whether the control command sent from the client-end computer through the webpage interface is received in the step a.

15. The controlling method in claim 14, wherein the control command is an inquiring command, and the step d comprises following steps:

d11) transforming the inquiring command into a second command having a UART format by the BMC module;

d12) requesting the HDD expander to inquiry status of the JBOD apparatus according to the second command by the BMC module;

d13) inquiring the status of the JBOD apparatus in accordance with the second command by the HDD expander;

d14) replying to the BMC module with a corresponding apparatus data by the HDD expander; and d15) updating the webpage interface according to the apparatus data by the BMC module, wherein the apparatus data comprises environment temperature inside a case of the JBOD apparatus, status of fans of the JBOD apparatus, status of power of the JBOD apparatus or power status of the plurality of hard drives.

16. The controlling method in claim 14, wherein the control command is a switching command, and the step d comprises following steps:
   d21) transforming the switching command into a second command having a UART format by the BMC module;
   d22) transmitting the second command to the HDD expander by the BMC module; and
   d23) switching a power status of the JBOD apparatus or the plurality of hard drives respectively in accordance with the second command by the HDD expander.

17. The controlling method in claim 14, wherein the control command is an updating command, and the step d comprises following steps:
   d31) transforming the updating command into a second command having a UART format by the BMC module;
   d32) transmitting the second command and a firmware updating file transmitted from the client-end computer to the HDD expander by the BMC module; and
   d33) updating a firmware of the HDD expander in accordance with the updating command and the firmware updating file by the HDD expander.

18. The controlling method in claim 17, wherein the BMC module is able to support an x-modem protocol, and the BMC module transmits the firmware updating file to the HDD expander through the x-modem protocol in the step d32.

* * * * *